United States Patent
Ito

(10) Patent No.: US 9,098,225 B2
(45) Date of Patent: Aug. 4, 2015

(54) PRINT PROCESSING METHOD AND PRINTING SYSTEM

(71) Applicant: CANON KABUSHIKI KAISHA, Tokyo (JP)

(72) Inventor: Morikazu Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/049,131

(22) Filed: Oct. 8, 2013

(65) Prior Publication Data

US 2014/0036313 A1  Feb. 6, 2014

Related U.S. Application Data

(62) Division of application No. 13/182,314, filed on Jul. 13, 2011.

(30) Foreign Application Priority Data

Aug. 26, 2010 (JP) .................................. 2010-189986

(51) Int. Cl.
*G06F 15/00* (2006.01)
*G06F 3/12* (2006.01)
*G06K 15/02* (2006.01)

(52) U.S. Cl.
CPC .............. *G06F 3/1293* (2013.01); *G06F 3/124* (2013.01); *G06F 3/1213* (2013.01); *G06F 3/1244* (2013.01); *G06F 3/1288* (2013.01); *G06K 15/1814* (2013.01)

(58) Field of Classification Search
USPC ................................................ 358/1.13, 1.15
See application file for complete search history.

(56) References Cited

U.S. PATENT DOCUMENTS

| 8,248,411 B2 | 8/2012 | Oishi |
| 2005/0168768 A1 | 8/2005 | Ito |
| 2005/0273570 A1* | 12/2005 | DeSouter et al. ............. 711/203 |

(Continued)

FOREIGN PATENT DOCUMENTS

| JP | 9-204277 A | 8/1997 |
| JP | 2000-141811 A | 5/2000 |

(Continued)

OTHER PUBLICATIONS

Japanese Office Action dated Apr. 4, 2014 issued in corresponding Japanese Patent Application No. 2010-189986.

*Primary Examiner* — Saeid Ebrahimi Dehkord

(74) *Attorney, Agent, or Firm* — Fitzpatrick, Cella, Harper & Scinto

(57) ABSTRACT

A server constituted by a plurality of processors which process page description language data receives a print instruction from a client, and decides the number of layers into which a page is to be segmented based on render instructions included in the page description language data. The server decides the number of processors which perform parallel processing of the generation of print data from the page description language data based on the decided number of layers. The server generates print data equal in number to the number of layers based on which the number of processors is decided. An output device requests the server to transmit print data. The server transmits print data in accordance with the request from the output device. Upon receiving the print data from the server, the output device processes the print data and outputs it onto a sheet.

16 Claims, 14 Drawing Sheets

(56) References Cited

U.S. PATENT DOCUMENTS

| | | |
|---|---|---|
| 2009/0033986 A1* | 2/2009 | Himpe .................. 358/1.15 |
| 2010/0020354 A1 | 1/2010 | Ito |
| 2011/0141508 A1* | 6/2011 | Inoue et al. ............. 358/1.13 |
| 2011/0255124 A1* | 10/2011 | Klassen ................ 358/1.15 |
| 2013/0250353 A1* | 9/2013 | Hara ..................... 358/1.15 |

FOREIGN PATENT DOCUMENTS

| | | |
|---|---|---|
| JP | 2007-94758 A | 4/2007 |
| JP | 2009-245436 A | 10/2009 |

* cited by examiner

F I G. 3
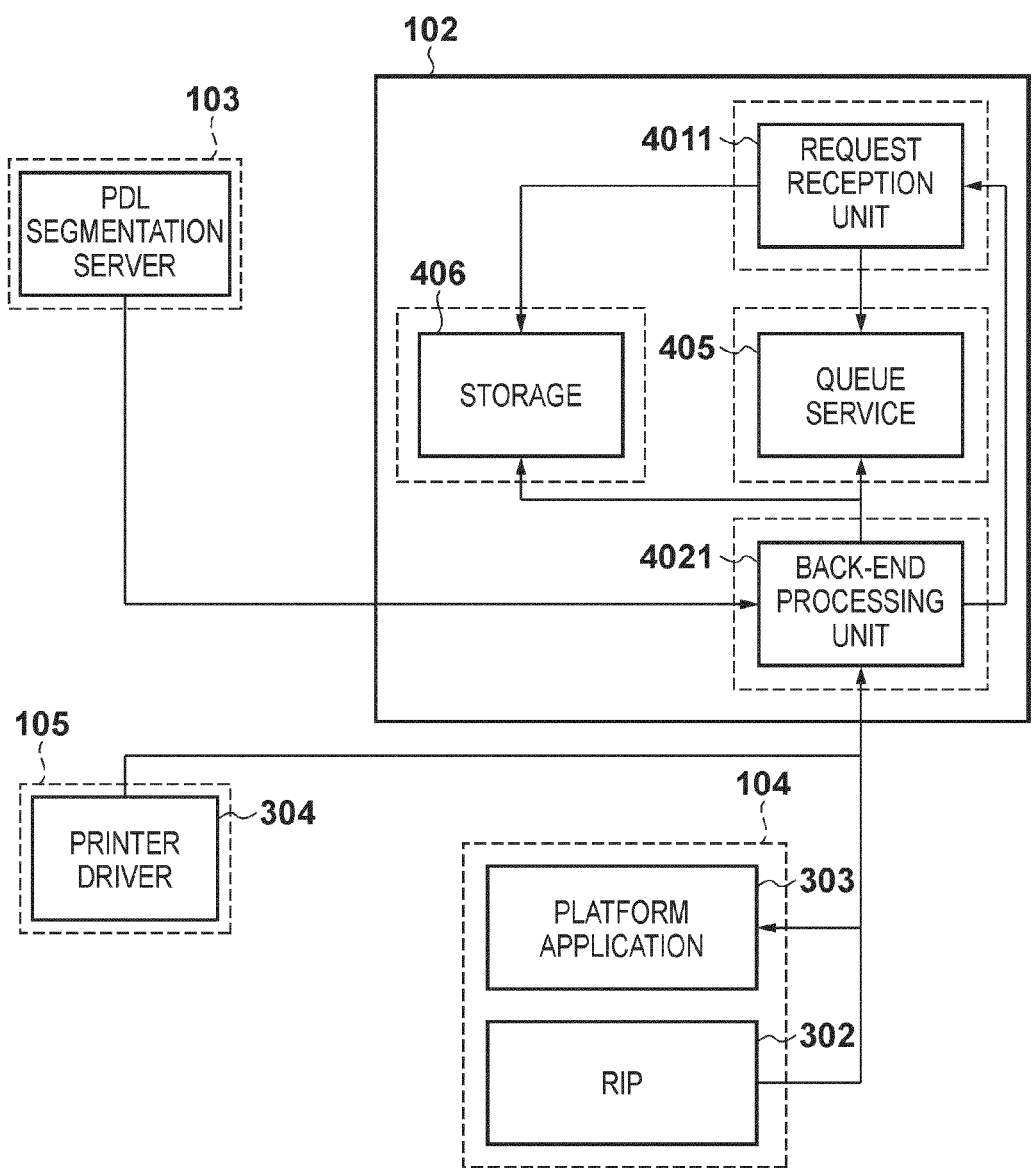

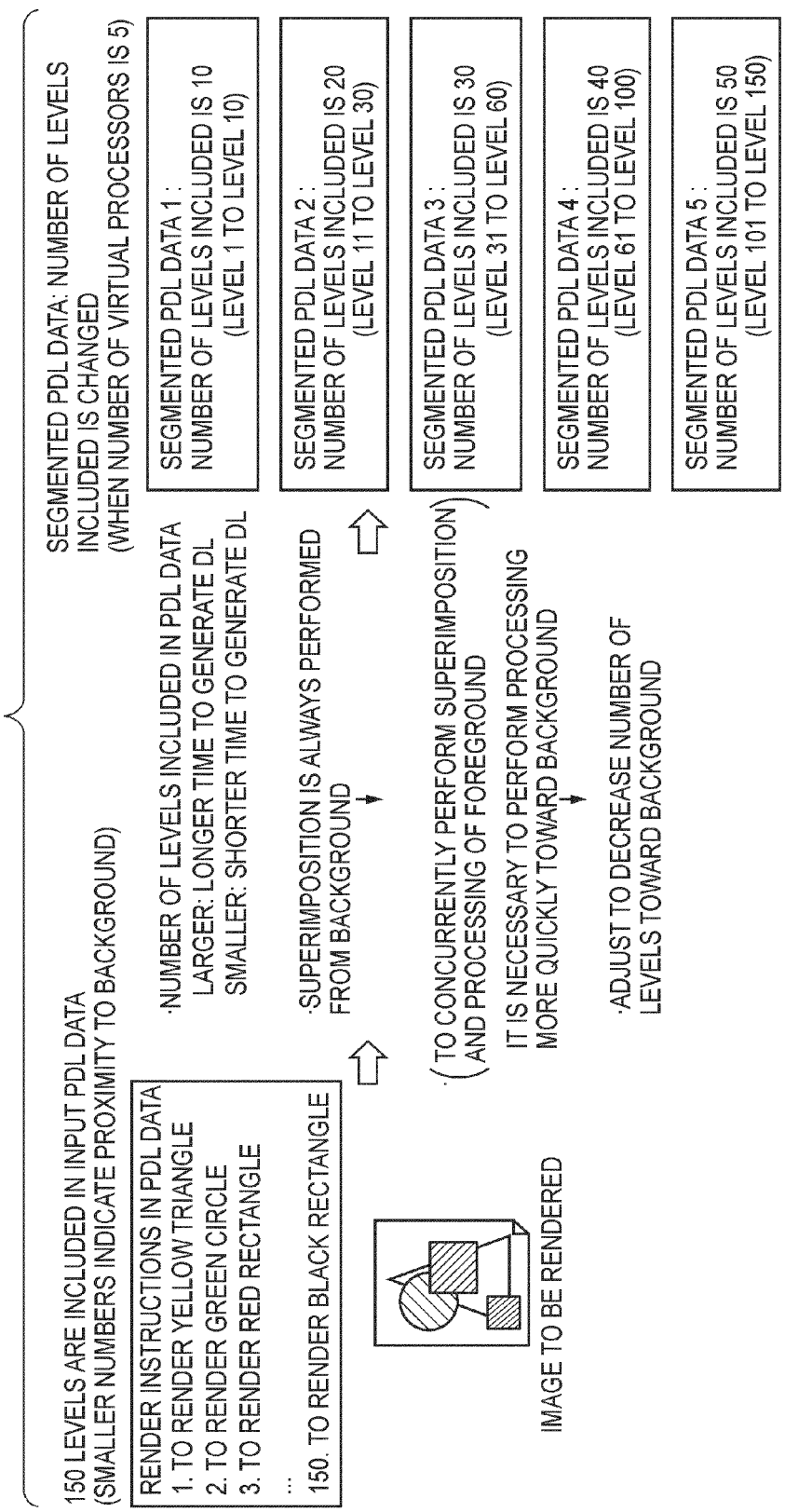

F I G. 12A

PROCESSING SPEED ESTIMATION IN LAYER SEGMENTATION PREMISES 〜1201
·DATA WHICH INCLUDES COMPLICATED RENDER COMMANDS AND DOES NOT ALLOW TO ACHIEVE ENGINE SPEED (50 ppm)
·FALLBACK OCCURS FIVE TIMES
·TIME TAKEN TO GENERATE DL IS 0.3 SEC/LAYER
·TIME TAKEN FOR HARD RIP IS 0.1 SEC/LAYER
·TIME TAKEN FOR SOFT RIP IS 0.3 SEC/LAYER
·PROCESSING TIME TAKEN FOR SUPERIMPOSITION IS 0.1 SEC/LAYER
·TIME TAKEN TO TRANSMIT DL TO DEVICE IS 0.1 SEC/LAYER
·TIME TAKEN TO TRANSMIT BITMAP TO DEVICE IS 0.3 SEC/LAYER

PRINT PROCESSING METHOD AND PRINTING SYSTEM

This application is a divisional of U.S. application Ser. No. 13/182,314 filed Jul. 13, 2011 (pending), the contents of which are incorporated herein by reference.

BACKGROUND OF THE INVENTION

1. Field of the Invention

The present invention relates to a print processing method and a printing system.

2. Description of the Related Art

Conventionally, the printer driver of a host PC generates page description language (PDL) data and transfers it to a print processing apparatus, which in turn performs print processing of the PDL data. More specifically, the controller in the print processing apparatus generates a display list (DL), and renders the data into a bitmap using a hardware or software renderer.

There has also been proposed a technique of processing a page which is accompanied by complicated render commands output from an application and hence takes much time for print processing when rendering the data, by segmenting the PDL data for each band to concurrently generate DLs, and concurrently rendering the DLs segmented for each band. See, for example, Japanese Patent Laid-Open Nos. 2000-141811 and 2009-245436. Concurrently processing PDL/DL data segmented for each band speeds up the processing of a page which takes much time for processing.

In addition, as forms of performing various types of processes on the server side, techniques called a cloud computing system and SaaS (Software as a Service) have recently begun to be used.

In the conventional technique described above, however, since PDL and DL data are segmented into bands and concurrently processed, if render instructions are unevenly distributed in a page, the processing times for the respective bands vary. For this reason, one page is not generated until the processing of a band including the largest number of render instructions is complete.

Furthermore, the conventional technique described above gives no consideration to the engine speed of a device which outputs a sheet of paper when segmenting PDL and DL data in a page. For this reason, even if PDL and DL data are segmented, the device cannot fully exhibit its performance.

SUMMARY OF THE INVENTION

The present invention provides a method and system which can perform data segmentation in consideration of the engine speed of a device, by using an optical segmentation method when performing parallel processing.

According to one aspect of the present invention, there is provided a print processing method for a printing system in which a client which issues a print instruction, a server including a plurality of processors which process page description language data, and an output device which outputs print data generated from the page description language data are connected to each other via a network, wherein the server executes: a reception step of receiving a print instruction from the client; a decision step of deciding the number of layers into which a page is segmented, based on render instructions included in the page description language data, and deciding the number of processors which perform parallel processing for generation of print data from the page description language data, based on the decided number of layers; a generation step of generating the print data equal in number to the number of layers based on which the number of processors is decided in the decision step; and a transmission step of transmitting the print data generated in the generation step in accordance with a request from the output device, and wherein the output device executes: a requesting step of requesting the server to transmit the print data; and an output step of processing the print data upon receiving the print data from the server in the requesting step, and outputting the print data onto a sheet.

Further features of the present invention will become apparent from the following description of exemplary embodiments (with reference to the attached drawings).

BRIEF DESCRIPTION OF THE DRAWINGS

FIG. 3 is a block diagram showing the functions of each apparatus of the printing system;

FIG. 11 is a view for explaining weighting operation for PDL segmentation;

FIGS. 12A and 12B are views for explaining processing speed estimation in layer segmentation.

DESCRIPTION OF THE EMBODIMENTS

Embodiments of the present invention will be described in detail below in accordance with the accompanying drawings.

<Arrangement of Printing System>

Figure 1:
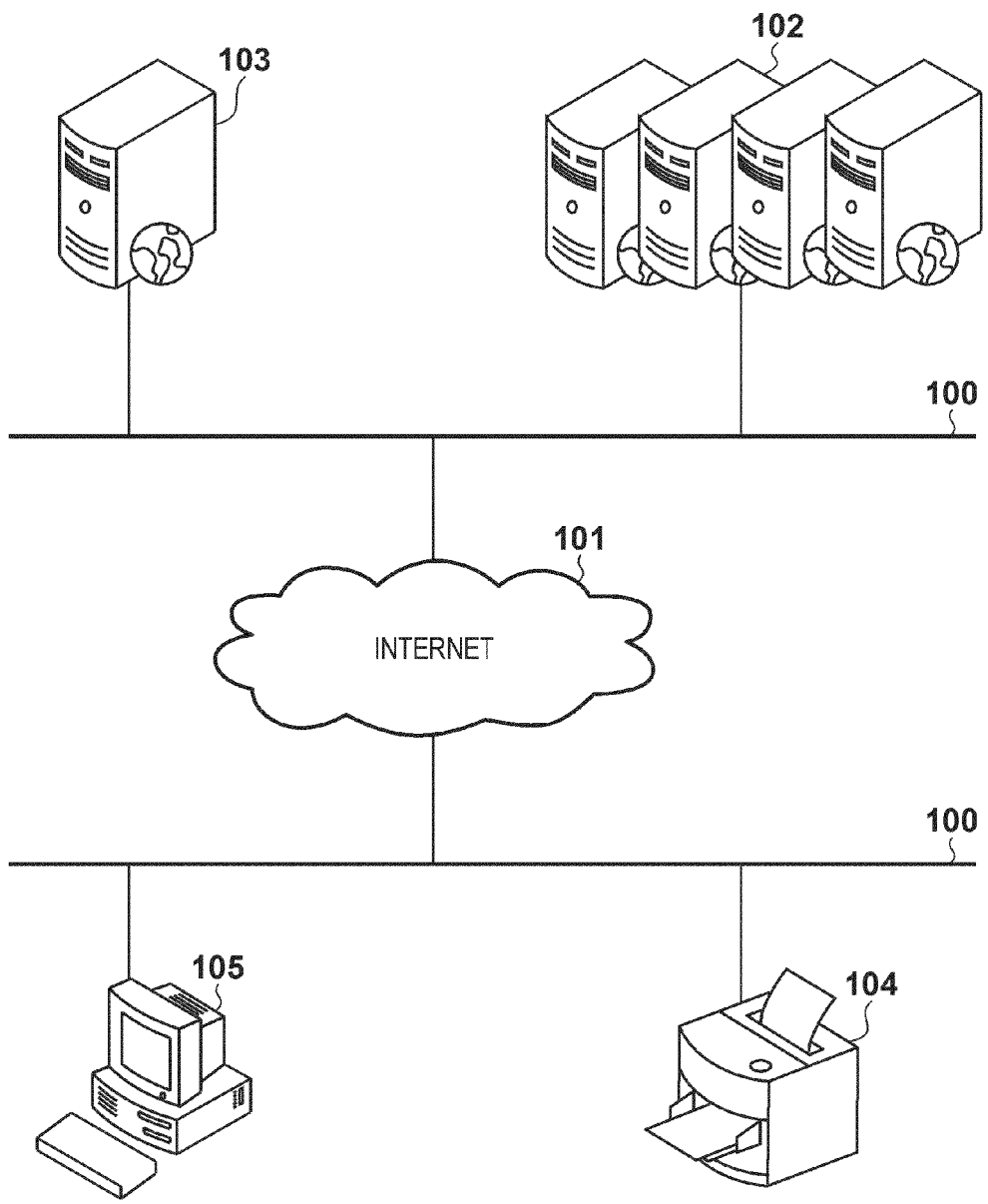
FIG. 1 is a view showing a plurality of apparatuses constituting a printing system.

A plurality of apparatuses constituting a printing system will be described first with reference to FIG. 1. As shown in FIG. 1, the respective apparatuses constituting the printing system are connected to each other via networks 100.

In this case, the respective apparatuses include a virtual processor group 102, a PDL segmentation server 103, an image forming apparatus 104 as an output device, and a client computer (client PC) 105. The networks 100 are communication lines for the exchange of information among the respective apparatuses. The Internet 101 is a communication line for the exchange of information among the respective apparatuses over firewalls. The Internet 101 allows the network 100 to which the virtual processor group 102 and the PDL segmentation server 103 belong to communicate with the network 100 to which the image forming apparatus 104 and the client PC 105 belong, over the firewalls.

The networks 100 and the Internet 101 are, for example, communication networks which support the TCP/IP protocol, and it does not matter whether they are wired or wireless. FIG. 1 shows the virtual processor group 102 as a processor group. However, a plurality of processors may be prepared as servers, and the PDL segmentation server 103 may include them.

Figure 2A:
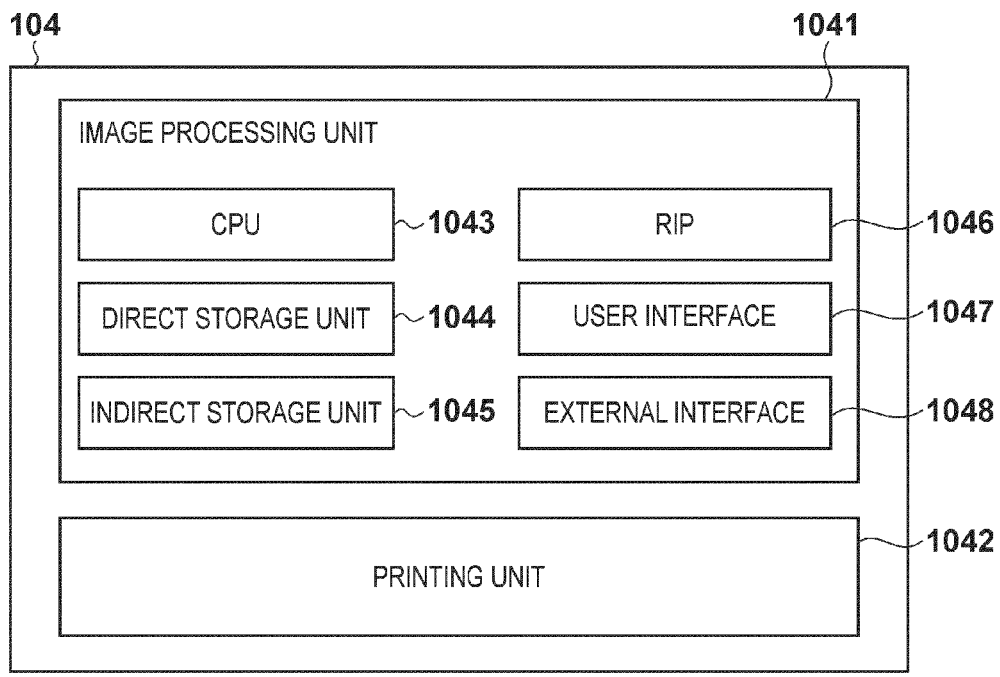
FIG. 2A is a block diagram showing the internal arrangement of an image forming apparatus.

The internal arrangements of the respective apparatuses constituting the printing system shown in FIG. 1 will be described in detail next. The internal arrangement of the image forming apparatus 104 will be described first with reference to the block diagram shown in FIG. 2A.

The image forming apparatus 104 includes two units, namely an image processing unit 1041 and a printing unit 1042. In this case, the image processing unit 1041 incorporates a CPU 1043, a direct storage unit 1044, an indirect storage unit 1045, a RIP 1046, a user interface 1047, and an external interface 1048. Note that RIP is an abbreviation for "Raster Image Processor".

The CPU 1043 is a unit which issues instructions for various kinds of control of the image forming apparatus 104 by executing predetermined programs. The direct storage unit 1044 is a work memory to be used when the CPU 1043 executes various programs. A program to be executed by the CPU 1043 is loaded into the direct storage unit 1044. The direct storage unit 1044 is implemented by a RAM.

The indirect storage unit 1045 stores various kinds of programs including application programs and a platform program. Various kinds of programs stored in the indirect storage unit 1045 are moved to the direct storage unit 1044 when the CPU 1043 executes the programs. The indirect storage unit 1045 is implemented by an SSD (Solid State Drive) or HDD (Hard Disc Drive). Note that the CPU 1043 may be multiprocessor.

A platform will be described in detail below. Implementing the platform can execute the new application developed by the user on the image forming apparatus 104, and can also customize the image forming apparatus 104.

A method of implementing the platform will be described next. The CPU 1043 moves the platform program stored in the indirect storage unit 1045 to the direct storage unit 1044. When the program is completely moved, the CPU 1043 becomes ready to execute the platform program.

The operation of causing the CPU 1043 to execute the platform program will be referred to as "to activate the platform". Note that the platform will operate on firmware in the image forming apparatus 104. In addition, the platform program provides an environment for the execution of an application program.

A method of executing an application program on the platform will be described in detail next. Printing software which accepts a print request operates on the platform. This printing software transmits print data received from the client PC 105 to the RIP 1046 to make it start rendering processing of the print data (DL). For example, this software then transmits the print data (DL) to a device connected via the network 100 and the Internet 101 by using a communication protocol such as HTTP (Hyper Text Transfer Protocol). Executing the application program on the platform can implement control of the image forming apparatus 104.

A method of executing an application program will be described next. The activated platform moves the application program stored in the indirect storage unit 1045 to the direct storage unit 1044. Upon completion of the movement, the platform becomes ready to execute the application program. The platform then executes the application program. The function of the platform which can be provided by executing the application program in this manner will be referred to as a "platform application" in this embodiment. In addition, the platform can perform part of each of the processes based on the flowcharts disclosed in the embodiment.

The RIP 1046 is a unit which inputs PDL (Page Description Language) data (to be described later) and generates a bitmap. The RIP 1046 is implemented by hardware or software. The user interface 1047 is a unit necessary to accept a processing request from the user. For example, this unit accepts a signal corresponding to an instruction input by the user via a keyboard, mouse, or the like. The external interface 1048 can receive data from an external apparatus and transmit data to an external apparatus. For example, external apparatuses include external storage devices such as external HDDs and external USB memories and separate apparatuses such as separate host computers and image forming apparatuses which are connected via networks. Note that the image forming apparatus 104 can communicate with the client PC 105, the virtual processor group 102, and the like via the networks 100 and the Internet 101.

Figure 2B:
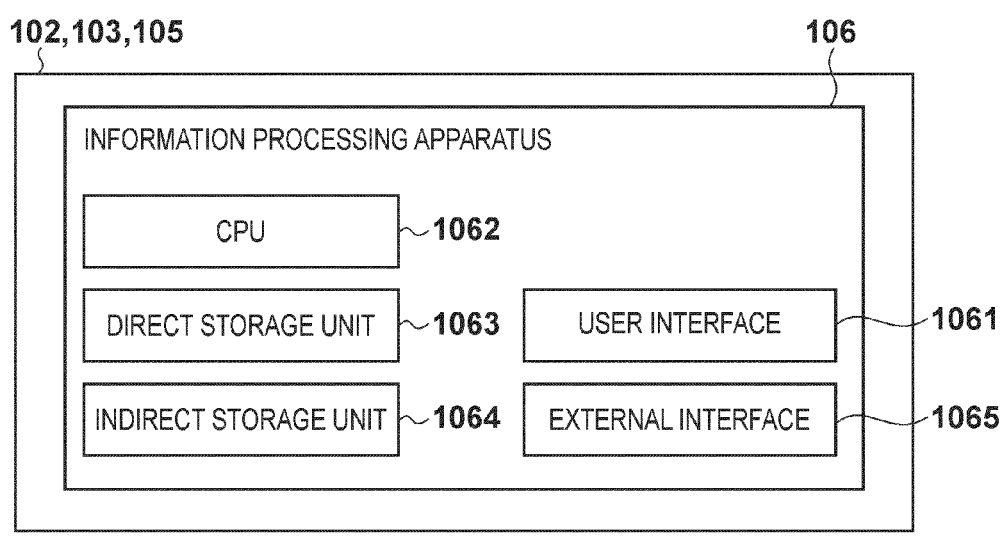
FIG. 2B is a block diagram showing an example of the internal arrangement of an information processing apparatus.

The internal arrangement of each of information processing apparatuses functioning as the virtual processor group 102, the PDL segmentation server 103, and the client PC 105 will be described with reference to FIG. 2B. FIG. 2B is a block diagram showing an example of the internal arrangement of an information processing apparatus 106. As shown in FIG. 2B, the information processing apparatus 106 includes a user interface 1061, a CPU 1062, a direct storage unit 1063, an indirect storage unit 1064, and an external interface 1065.

The user interface 1061 is a unit necessary to accept a processing request from the user. For example, this unit accepts a signal corresponding to an instruction input by the user via a keyboard, mouse, or the like. The CPU 1062 is a unit which issues instructions for various kinds of control of the information processing apparatus 106 by executing predetermined programs. The direct storage unit 1063 is a work memory to be used when the CPU 1062 executes a program. A program to be executed by the CPU 1062 is loaded into the direct storage unit 1063. The direct storage unit 1063 is implemented by a RAM.

The indirect storage unit 1064 stores various kinds of programs including application programs and an OS (Operating System). Various kinds of programs stored in the indirect storage unit 1064 are moved to the direct storage unit 1063 when the CPU 1062 executes the programs. The indirect storage unit 1064 is implemented by a ROM and an HDD. The external interface 1065 is connected to the network 100 and can communicate with other apparatuses connected to the network 100.

<Functions of Each Apparatus in Printing System>

The functions of each apparatus in the printing system according to this embodiment will be described next with reference to FIG. 3. FIG. 3 is a block diagram showing the functions of each apparatus in the printing system. The functions of the virtual processor group 102 will be described first. The virtual processor group 102 includes the functions of a request reception unit 4011, a back-end processing unit 4021, a queue service 405, and a storage 406.

The request reception unit 4011 has a function of accepting a processing request transmitted from the client PC 105 or the image forming apparatus 104. The back-end processing unit 4021 has a function of processing a processing request by using a processing program. More specifically, the back-end processing unit 4021 performs processing by loading a processing program into the memory of a processor which executes the back-end processing unit 4021. The request reception unit 4011 and the back-end processing unit 4021 are implemented by loading the request reception program and back-end processing program stored in the indirect storage unit 1064 in FIG. 2B into the direct storage unit 1063 and making the CPU 1062 execute them.

The queue service 405 has a function for asynchronous data communication with the request reception unit 4011 and the back-end processing unit 4021. The storage 406 has a function of storing various kinds of data including data as an execution result obtained by processing by the back-end processing unit 4021. The storage 406 is implemented by the indirect storage unit 1064 in FIG. 2B. The virtual processor group 102 is assumed to operate as a Worker Role in Windows Azure. The functions of the virtual processor group 102 have been described above, and will be described in further detail later.

The functions of the PDL segmentation server 103 will be described next. The PDL segmentation server 103 has a PDL segmentation function 301. The PDL segmentation function 301 is implemented by the CPU 1062, direct storage unit 1063, and indirect storage unit 1064 in FIG. 2B.

In this case, PDL is data generated by the user using a printer driver 304 on the client PC 105 (to be described later). The PDL segmentation server 103 is assumed to operate as a Web Role in Windows Azure.

The functions of the image forming apparatus 104 will be described in detail next. The image forming apparatus 104 has the functions of a RIP 302 and platform application 303. The platform application 303 has a function of acquiring data stored in the virtual processor group 102 connected via the network 100. The platform application 303 is implemented by loading the platform application program stored in the direct storage unit 1044 in FIG. 2A into the indirect storage unit 1045 and making the CPU 1043 execute it.

The RIP 302 has a function of providing a rendering service of interpreting print data (DL) and converting the data into a bitmap. In addition, this service checks for the request reception unit 4011 whether the generation of print data is complete. At this time, the service performs this check based on the ID generated by the PDL segmentation server 103.

The functions of the client PC 105 will be described last in detail. The printer driver 304 is installed in the client PC 105. The printer driver 304 has a function of generating PDL data from application data based on information stored in an output device (image forming apparatus 104) connected via the network 100. This function is implemented by loading the printer driver software stored in the indirect storage unit 1064 in FIG. 2B into the direct storage unit 1063 and making the CPU 1062 execute it. The above description is about the functions of each apparatus in the printing system according to this embodiment.

<Conventional Page Segmentation and Page Segmentation in this Embodiment>

Figure 4A:
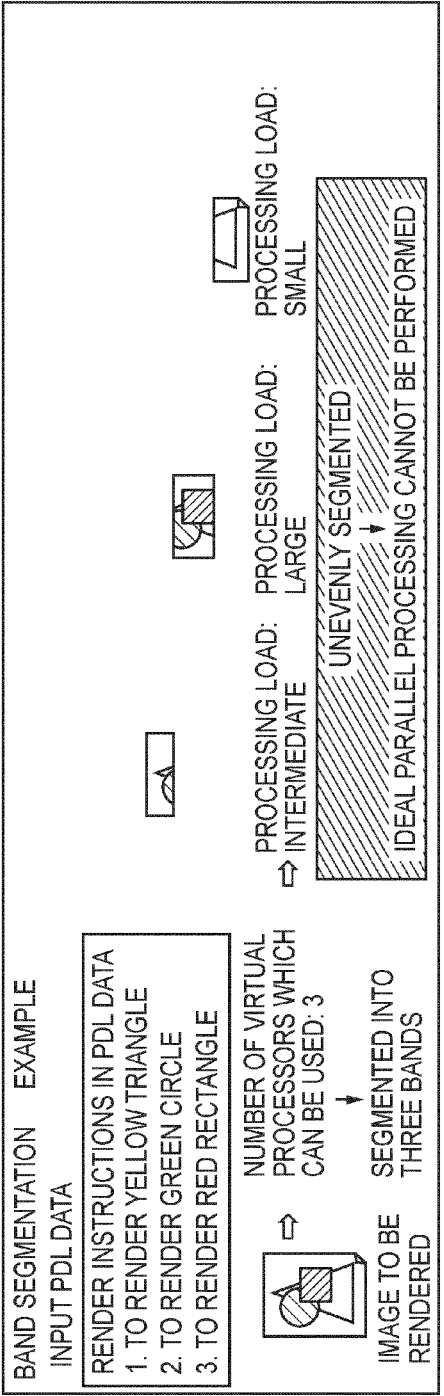
FIG. 4A is a view showing conventional PDL segmentation (band segmentation)

The differences between the conventional PDL segmentation function and the PDL segmentation function in the printing system according to this embodiment will be described in detail next with reference to FIGS. 4A and 4B. FIG. 4A shows a case of conventional PDL segmentation (band segmentation). In this case, the system renders, on the entire page, a triangle, circle, and rectangle sequentially arranged from the deepest side, from the render instructions included in PDL data (page description language data), so as to superimpose them. In this case, the apparatus segments the page into three bands, namely upper, intermediate, and lower bands, and concurrently processes them using three virtual processors.

As a consequence, the respective segmented PDL data include render instructions in the following manner. The first segmented PDL data includes render instructions corresponding to the upper portions of the triangle and circle. The second segmented PDL data includes render instructions corresponding to the intermediate portion of the triangle, the lower portion of the circle, and the entire rectangle such that they overlap each other. The third segmented PDL data includes the lower portion of the triangle.

When the loads of the respective rendering processes are calculated from the render instructions, the processing load of the first segmented PDL data is small, the processing load of the second segmented PDL data is large, and the processing load of the third segmented PDL data is small.

Figure 4B:
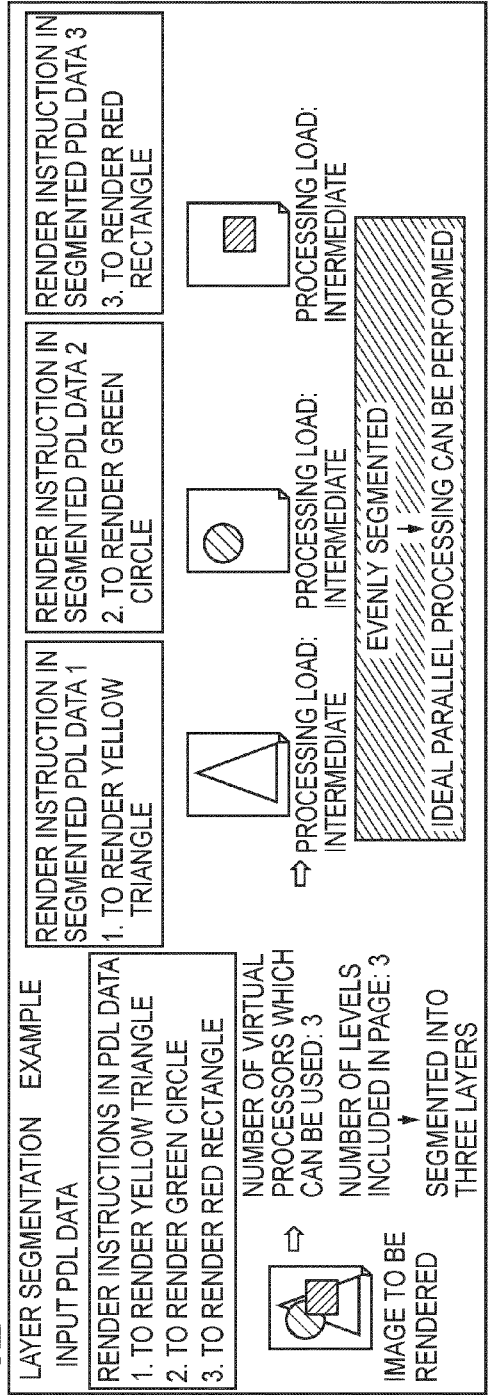
FIG. 4B is a view showing PDL segmentation (layer segmentation) in this embodiment.

FIG. 4B shows a case of PDL segmentation (layer segmentation) according to this embodiment. In this case, the system renders, on the entire page, a triangle, circle, and rectangle sequentially arranged from the deepest side, from the render instructions included in PDL data, so as to superimpose them. The system segments this page into three layers, with the background, intermediate, and uppermost layers respectively including the triangle, circle, and rectangle, and concurrently processes them using three virtual processors.

As a consequence, the respective segmented PDL data include render instructions in the following manner. The first segmented PDL data includes render instructions corresponding to the entire triangle. The second segmented PDL data includes render instructions corresponding to the entire circle. The third segmented PDL data includes render instructions corresponding to the entire rectangle.

When the loads of the respective rendering processes are calculated from the render instructions, the processing loads of the first to third segmented PDL data are all intermediate.

In parallel processing, the longest processing time among the segmented processes is regarded as the final processing time. For this reason, conventional band segmentation produces segmented PDL data with a light processing load and segmented PDL data with a heavy processing load depending on the uneven distribution of commands rendered in a page. This segmentation technique cannot always provide optimal segmentation. In contrast, segmentation for each layer as in this embodiment facilitates making adjustment so as to make the respective segmented PDL data have intended processing loads.

<Weighting in Page Segmentation>

Weighting in PDL segmentation in the printing system according to this embodiment will be described next in detail with reference to FIG. 11. In this case, the system renders, on the entire page, a triangle at the first level, a circle at the second level, and a rectangle at the third level, sequentially from the deepest side, based on the render instructions included in input PDL data, so as to superimpose them, and renders a rectangle at the 150th level on the uppermost surface.

As shown in FIG. 11, the processing of generating a DL from PDL data is characterized in that the larger the number of levels included in each PDL data, the longer the time it takes to process the PDL data, and vice versa. When finally printing the segmented PDL data, it is necessary to perform superimposition processing at the time of rendering. This processing must always be sequentially performed starting from the layer closest to the background surface.

When, therefore, segmenting PDL data, it is necessary to segment the PDL data so as to make PDL data on layers closer to the background surface include smaller numbers of levels and take shorter processing times, in consideration of the above characteristic, instead of evenly segmenting the PDL data in accordance with the number of virtual processors which can be used. This operation is called weighting.

FIG. 11 shows an example of how PDL data is segmented with weighting operation. In this case, when there are five virtual processors and input PDL data includes 150 levels, the number of levels included in segmented PDL data 1 in the deepest layer is 10, and the number of levels included in segmented PDL data 2 on segmented PDL data 1 is 20. The number of levels includes in segmented PDL data 3 on segmented PDL data 2 is 30. The number of levels included in segmented PDL data 4 on segmented PDL data 3 is 40. The number of levels included in segmented PDL data 5 on segmented PDL data 4 is 50.

The details of this processing will be described in association with <Processing of Deciding Numbers of Levels in PDL segmentation>, and the effects of weighting operation will be described in association with <Processing Speed Estimation in Layer Segmentation>.

<Overall Processing Sequence>

Figure 5:
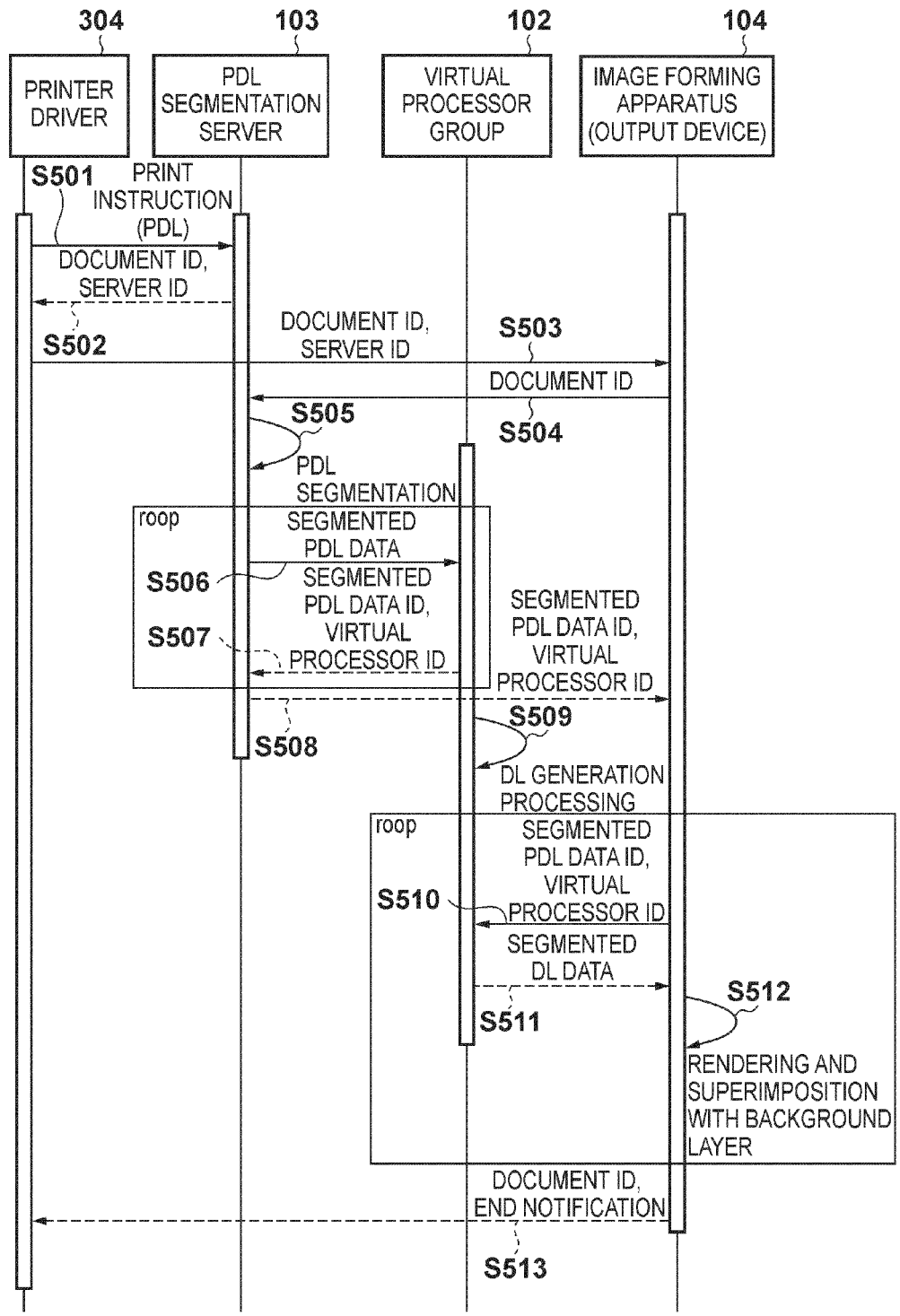
FIG. 5 is a view showing an overall processing sequence in the printing system.

An overall processing sequence in the printing system according to this embodiment will be described next with reference to FIG. 5. First of all, the user issues a print instruction from the printer driver 304 of the client PC 105 to the PDL segmentation server 103 in step S501. Upon receiving the print instruction, the PDL segmentation server 103 returns a document ID and a server ID to the printer driver 304 in step S502. In step S503, the printer driver 304 sends the document ID and the server ID to the output device 104 which outputs a sheet of paper.

In step S504, the output device 104 sends the document ID to the PDL segmentation server 103 to perform polling to acquire PDL segmentation information. In step S505, the PDL segmentation server 103 also performs PDL segmentation processing based on the print instruction received in step S501.

The PDL segmentation server 103 transmits each segmented PDL data to the virtual processor group 102 in step S506, and receives the segmented PDL data IDs and the virtual processor IDs from the virtual processor group 102 in step S507. Upon completion of the segmentation of all the pages and transmission to the virtual processor group 102, the PDL segmentation server 103 transmits the respective segmented PDL data IDs and the virtual processor IDs of the virtual processors which are processing the PDL data to the output device 104 in step S508.

In step S509, the virtual processor group 102 converts the respective segmented PDL data received in step S506 into DLs. In step S510, the output device 104 performs polling to check, based on the segmented PDL data IDs and virtual processor IDs received in step S508, whether the generation of DLs from the deepest layer is complete. If this processing is complete, the output device 104 acquires the segmented DLs in step S511. In step S512, the output device 104 then renders the acquired DL and performs superimposition processing as needed. The output device 104 repeats the above processing for all the DLs. Upon completion of this processing, the output device 104 notifies the printer driver 304 of the end of printing in step S513.

<Overall Processing Procedure>

Figure 6:
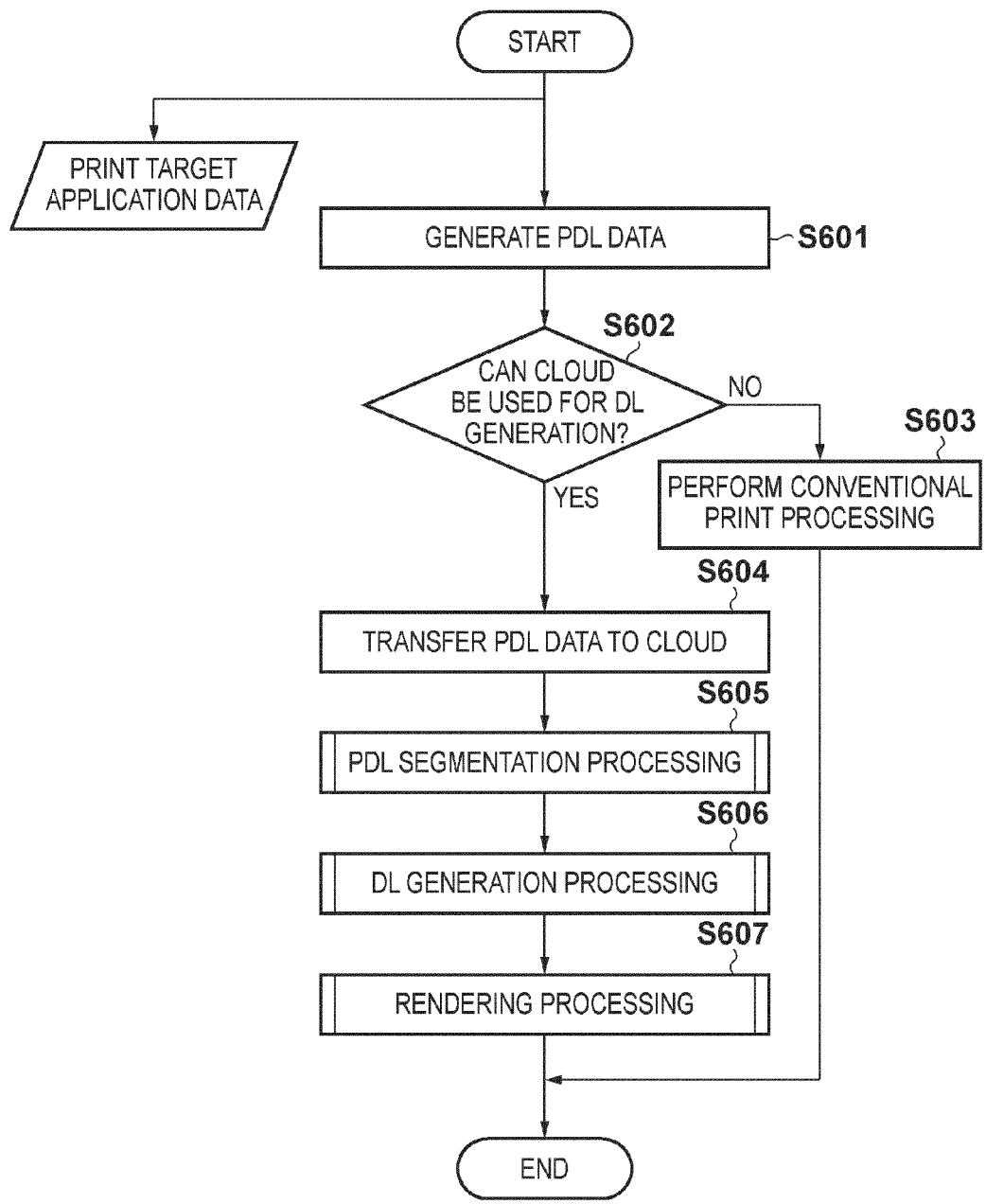
FIG. 6 is a flowchart showing an overall processing procedure.
Figure 7:
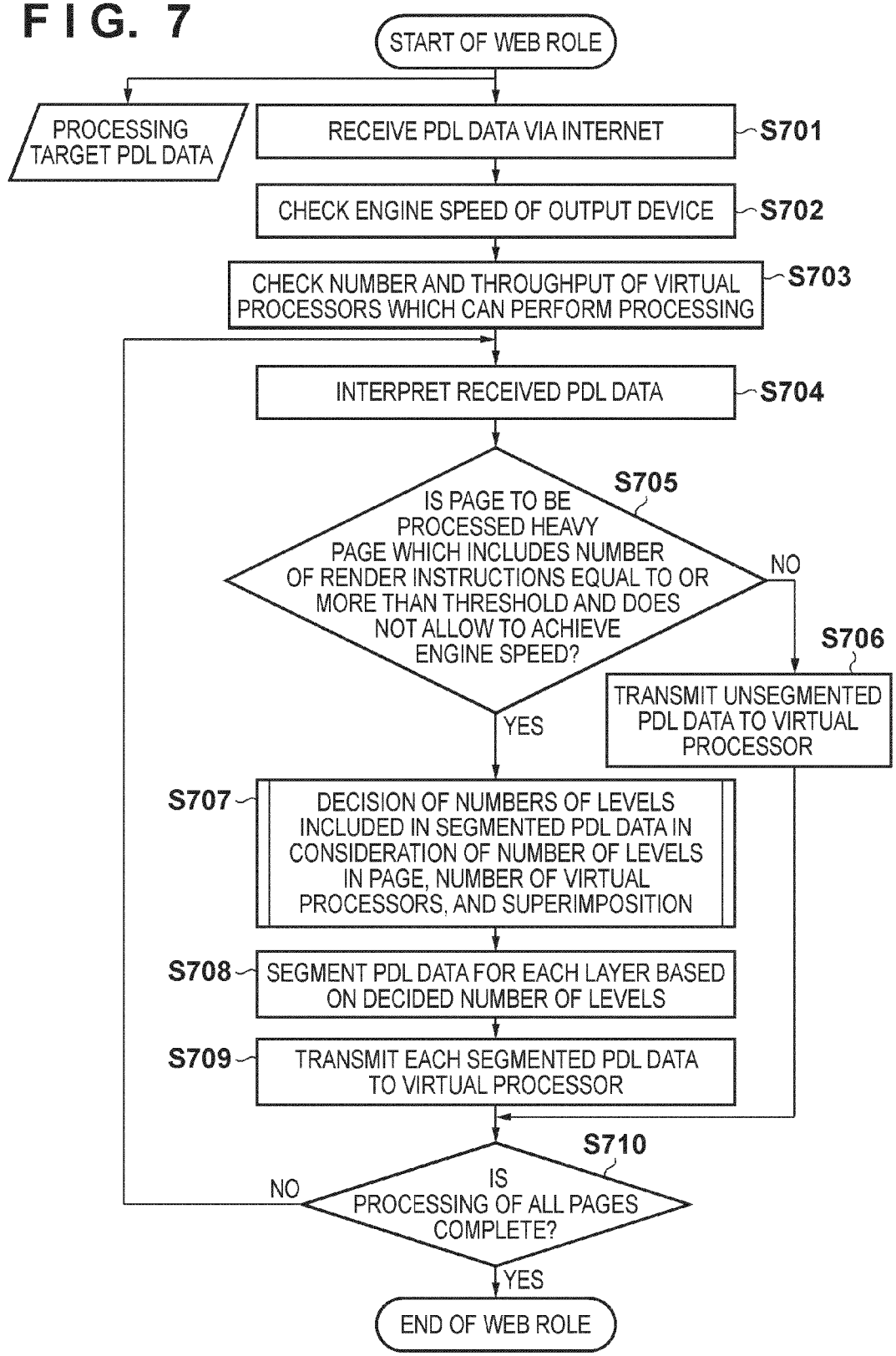
FIG. 7 is a flowchart showing a processing procedure in a PDL segmentation server.
Figure 8:
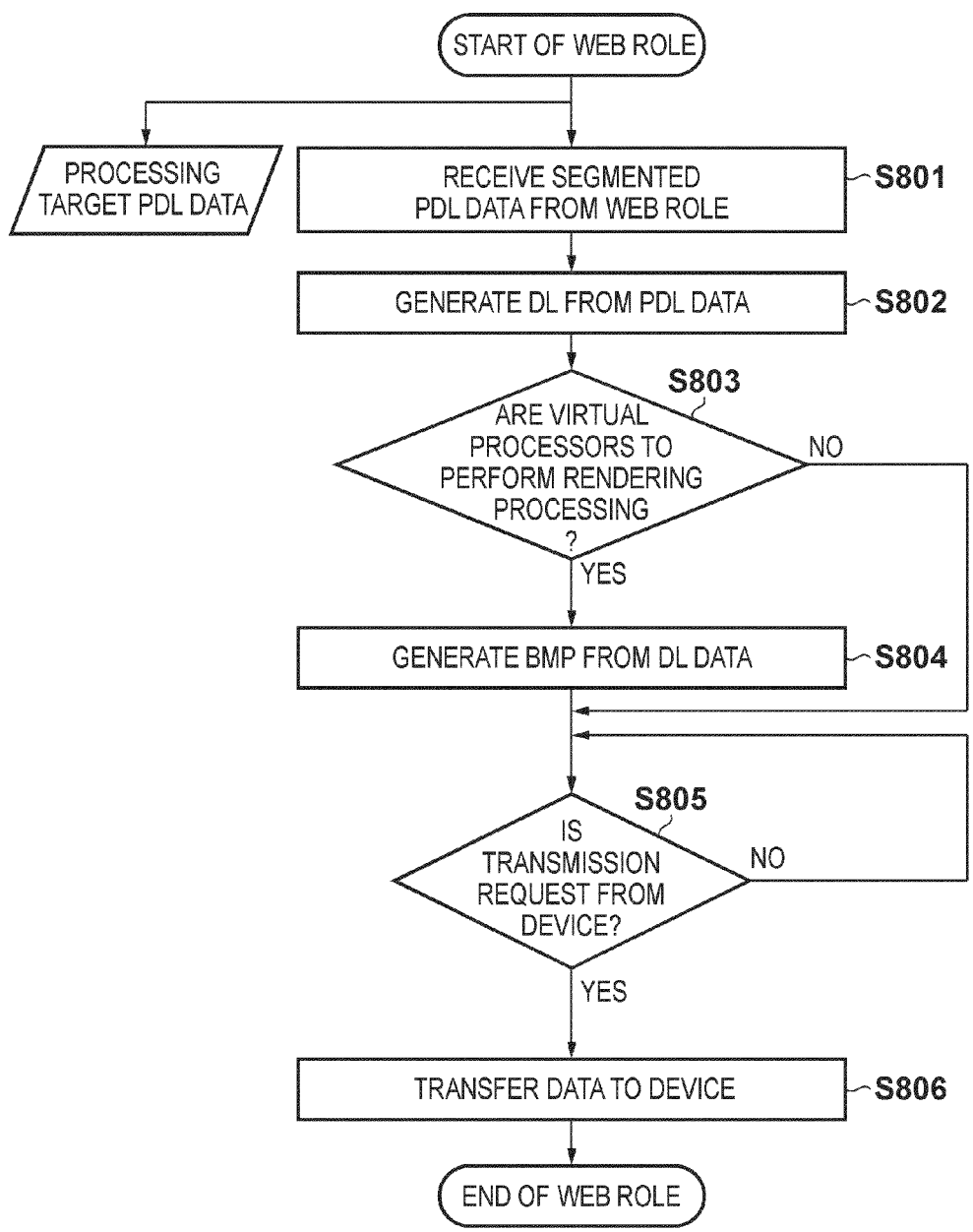
FIG. 8 is a flowchart showing the details of PDL segmentation in the PDL segmentation server.
Figure 9:
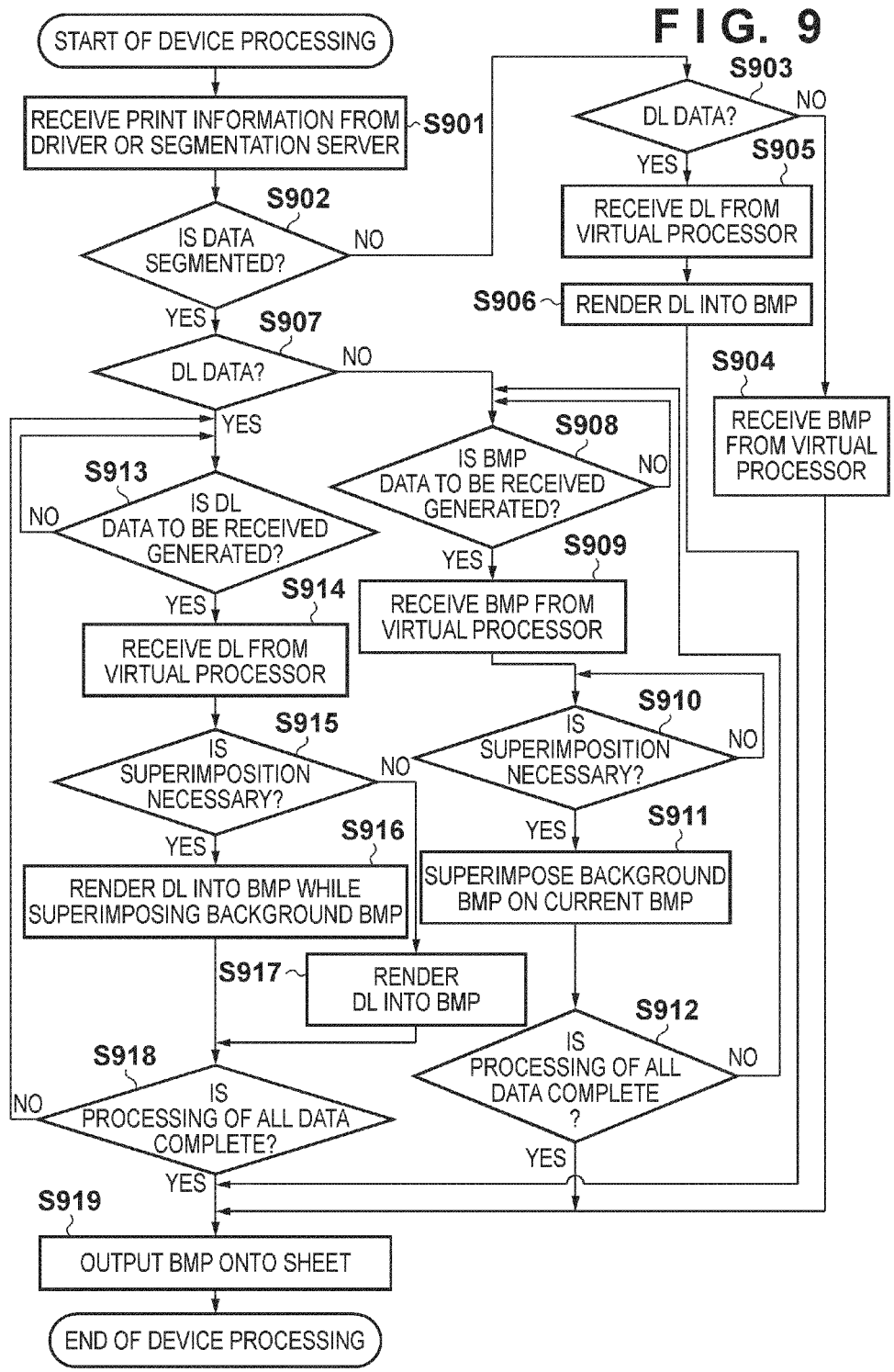
FIG. 9 is a flowchart showing a processing procedure in a virtual processor group.
Figure 10:
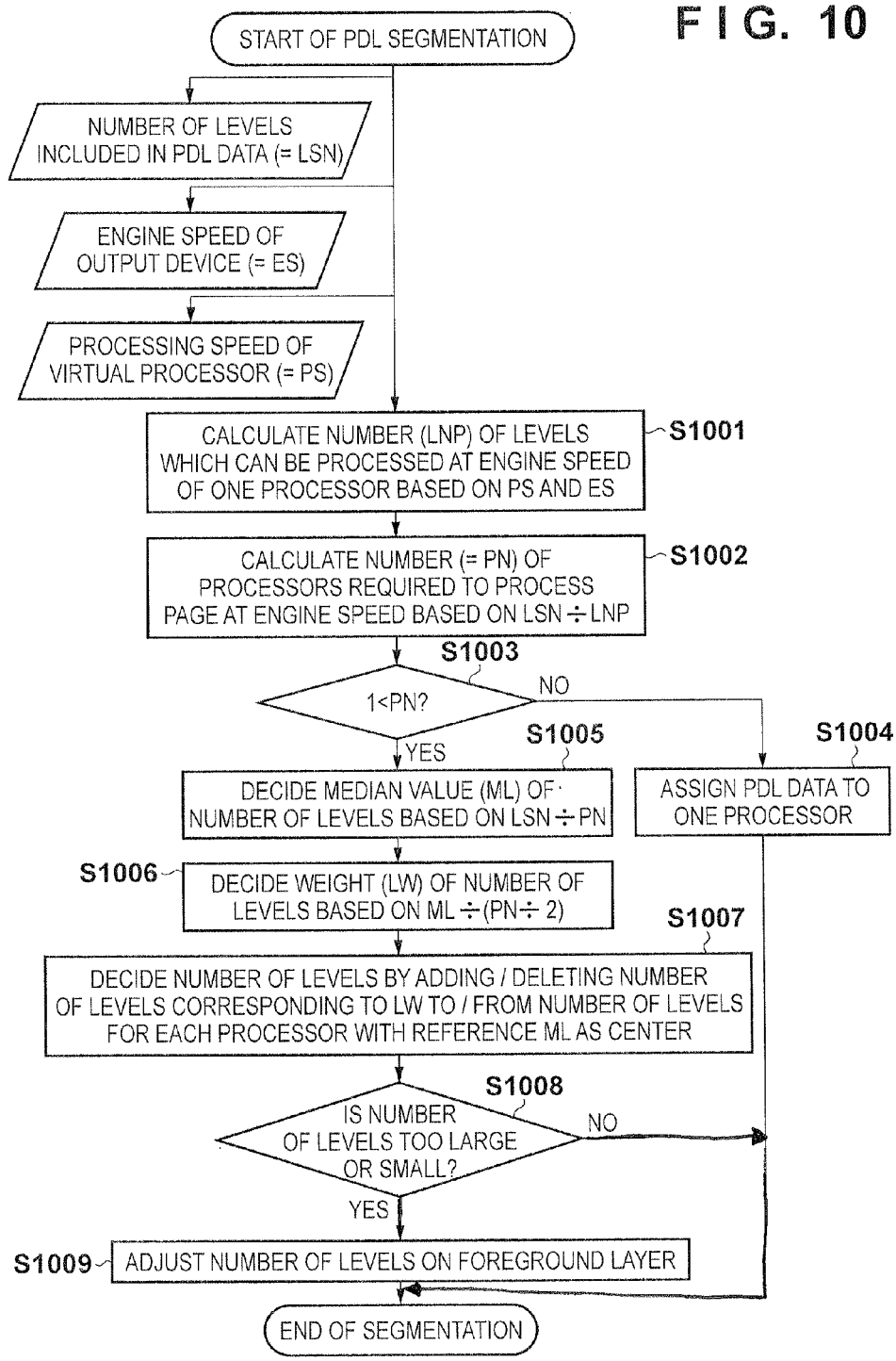
FIG. 10 is a flowchart showing a processing procedure in an output device.

The operation of the printer driver, PDL segmentation server, virtual processor group, and output device will be described next with reference to FIGS. 6 to 10. FIG. 6 shows an overall processing procedure in this embodiment. FIG. 7 shows a processing procedure in the PDL segmentation server 103. FIG. 8 shows a detailed procedure for PDL segmentation in the PDL segmentation server 103. FIG. 9 shows a processing procedure in the virtual processor group 102. FIG. 10 shows a processing procedure in the output device 104.

The overall processing procedure will be described first with reference to FIG. 6. In step S601, the printer driver 304 of the client PC 105 generates PDL data from print target data designated by a printing application in step S601. The printer driver 304 then determines in step S602 whether a cloud environment can be used. If NO in step S602, the printer driver 304 causes the output device 104 to execute print processing under a conventional local environment in step S603, and terminates this processing.

If the printer driver 304 determines in step S602 that a cloud environment can be used, as shown in FIG. 1, the printer driver 304 transfers the PDL data to the PDL segmentation server 103 on the cloud in step S604. With this operation, the PDL segmentation server 103 segments the PDL data received in step S605. The details of segmentation processing in the PDL segmentation server 103 will be described later in association with <PDL Segmentation Processing (Web Role)>

The PDL segmentation server 103 then transmits the segmented PDL data obtained by segmentation in step S605 to the virtual processor group 102. In step S606, the virtual processor group 102 concurrently generates the DLs of the segmented PDL data. The details of the processing in the virtual processor group 102 will be described later in association with <Segmented PDL Data DL Generation Processing (Worker Role)>

The generated DLs are transmitted to the output device 104. In step S607, the output device 104 renders the respective DLs to generate a bitmap, and performs superimposition processing as needed, thereby generating a one-page image. The details of this processing in the output device 104 will be described in association with <Rendering Processing in Device>.

<PDL Segmentation (Web Role)>

Web Role processing as PDL segmentation processing in this embodiment will be described next with reference to FIG. 7. In step S701, the PDL segmentation server 103 receives PDL data as a processing target via the Internet 101. In step S702, the PDL segmentation server 103 checks the engine speed of the output device 104. In step S703, the PDL segmentation server 103 checks the number and throughputs of virtual processors of the virtual processor group 102.

The PDL segmentation server 103 then interprets the PDL data received in step S704 to check in step S705 whether each page of the PDL data is a heavy page that does not allow to achieve the engine speed unless the render commands included in the page are segmented with a threshold or more. If NO in step S705, the PDL segmentation server 103 transmits the unsegmented PDL data to the virtual processor group 102 in step S706. The process then advances to step S710. If YES in step S705, the PDL segmentation server 103 decides the number of levels included in each segmented PDL data in consideration of the number of levels in each page, the number of virtual processors, and superimposition in step S707. The details of this processing will be described in association with <Processing of Deciding Numbers of Levels in PDL Segmentation>

The PDL segmentation server 103 then segments the PDL data into layers (for each layer) based on the numbers of levels decided in step S708. It is easy to perform segmentation because objects to be rendered are described in the PDL data from the deepest layer. Each PDL data segmented in step S709 is then transmitted to the virtual processor group 102. In step S710, the PDL segmentation server 103 determines whether the processing of all the pages of the received PDL data is complete. If NO in step S710, the process returns to step S704 to process the next page. If the PDL segmentation server 103 determines in step S710 that the processing of all the pages is complete, the PDL segmentation server 103 terminates this processing.

<Segmented PDL Data DL Generation Processing (Worker Role)>

Worker Role processing as segmented PDL data DL generation processing in this embodiment will be described next with reference to FIG. 8. In step S801, the virtual processor group 102 receives segmented PDL data to be processed from the PDL segmentation server 103. In step S802, the virtual processor group 102 generates a DL from each segmented PDL data received in step S802. In step S803, the virtual processor group 102 determines whether to perform processing up to rendering processing by determining whether the band between the output device 104 and the virtual processor group 102 is wider than a predetermined band. If YES in step S803, the virtual processor group 102 interprets the DL and renders it into a bitmap in step S804.

If NO in step S803, the process advances to step S805, in which the virtual processor group 102 determines whether there is any transmission request from the output device 104. If the virtual processor group 102 determines that there is no transmission request, the process loops until the output device 104 issues a transmission request. If there is a transmission request from the output device 104, the process advances to step S806, in which the virtual processor group 102 transfers the DL generated in step S802 or the bitmap generated in step S804 to the output device 104, and terminates this processing.

<Rendering Processing in Device>

Rendering processing in the device according to this embodiment will be described next with reference to FIG. 9. In step S901, the output device 104 receives print information from the printer driver 304 or Web Role. In step S902, the output device 104 determines whether the received data is segmented data. If NO in step S902, the output device 104 determines in step S903 whether the data is a DL. If NO in step S903, the output device 104 receives the bitmap from the virtual processor group 102 in step S904. The process then advances to step S919. If YES in step S903, the output device 104 receives the DL from the virtual processor group 102 in step S905. In step S906, the output device 104 renders the received DL into a bitmap. The process then advances to step S919.

If the output device 104 determines in step S902 that the received data is segmented data, the output device 104 determines in step S907 whether the data is DL data. If NO in step S907, the output device 104 waits in step S908 until a bitmap to be received is generated. If a bitmap is generated, the output device 104 receives the generated bitmap from the virtual processor group 102 in step S909. In step S910, the output device 104 determines whether it is necessary to perform superimposition. If the output device 104 determines that there is no need to perform superimposition as in a case in which the bitmap corresponds to the background surface, the process advances to step S912. If it is necessary to perform superimposition, the output device 104 performs superimposition processing for the background and the currently processed bitmap in step S911. In step S912, the output device 104 determines whether the processing of all the data is complete. If the processing is not complete, the process advances to step S908. If the processing is complete, the process advances to step S919.

If the output device 104 determines in step S907 that the data is DL data, the output device 104 waits in step S913 until a DL to be received is generated. When DL data is generated, the output device 104 receives the DL data from the virtual processor group 102 in step S914. In step S915, the output device 104 determines whether it is necessary to perform superimposition. If the output device 104 determines in step S917 that there is no need to perform superimposition as in a case in which the DL data corresponds to the background surface, the output device 104 renders the DL data into a bitmap. The process then advances to step S918. If it is necessary to perform superimposition in step S916, the output device 104 generates a bitmap from the DL under processing which is to be superimposed while performing superimposition processing for the bitmap on the background. In step S918, the output device 104 determines whether the processing of all the data is complete. If NO in step S918, the process returns to step S913 to start processing the next layer. If YES in step S918, the output device 104 outputs the generated bitmap onto a sheet in step S919, and terminates this processing.

<Processing of Deciding Numbers of Levels in PDL Segmentation>

The processing of deciding the numbers of levels in PDL segmentation in this embodiment will be described next with reference to FIG. 10. First of all, in step S1001, the PDL segmentation server 103 inputs three conditions including a number LSN of levels included in PDL data to be processed, an engine speed ES of the output device 104, and a throughput PS of the virtual processor group 102. The PDL segmentation server 103 then calculates a number LNP of levels that can be processed by the virtual processor group 102 within the engine speed ES from the throughput PS and the engine speed ES.

In step S1002, the PDL segmentation server 103 calculates a number PN of virtual processors for processing the PDL data at the engine speed by dividing the number LSN of levels included in the PDL data by the throughput of the virtual processor group 102. In step S1003, the PDL segmentation server 103 determines whether the calculated number PN is larger than one. If NO in step S1003, the PDL segmentation server 103 assigns one-page PDL data to one virtual processor without segmenting the PDL data in step S1004.

If the PDL segmentation server 103 determines in step S1003 that the calculated number PN is larger than one, the PDL segmentation server 103 calculates a median value ML of the number of levels in the PDL data by dividing the number of levels included in the PDL data by the number of virtual processors required in step S1005. In step S1006, the PDL segmentation server 103 calculates a weight LW for the number of levels for each virtual processor by dividing the median value ML of levels by the value obtained dividing the number LSN of levels included in the PDL data by two. In step S1007, the PDL segmentation server 103 decides the number of levels by adding or deleting the number of levels corresponding to the weight for each virtual processor with reference to the median value ML as the center.

In step S1008, the PDL segmentation server 103 determines whether the determined number of levels is too large or small. If NO in step S1008, the PDL segmentation server 103 terminates this processing. If YES in step S1008, the PDL segmentation server 103 adjusts the numbers of levels by adding or deleting the number of levels corresponding to the excess or deficiency to or from the number of levels on the foreground layer in step S1009. The PDL segmentation server 103 then terminates this processing.

<Processing Speed Estimation in Layer Segmentation>

Figure 12B:
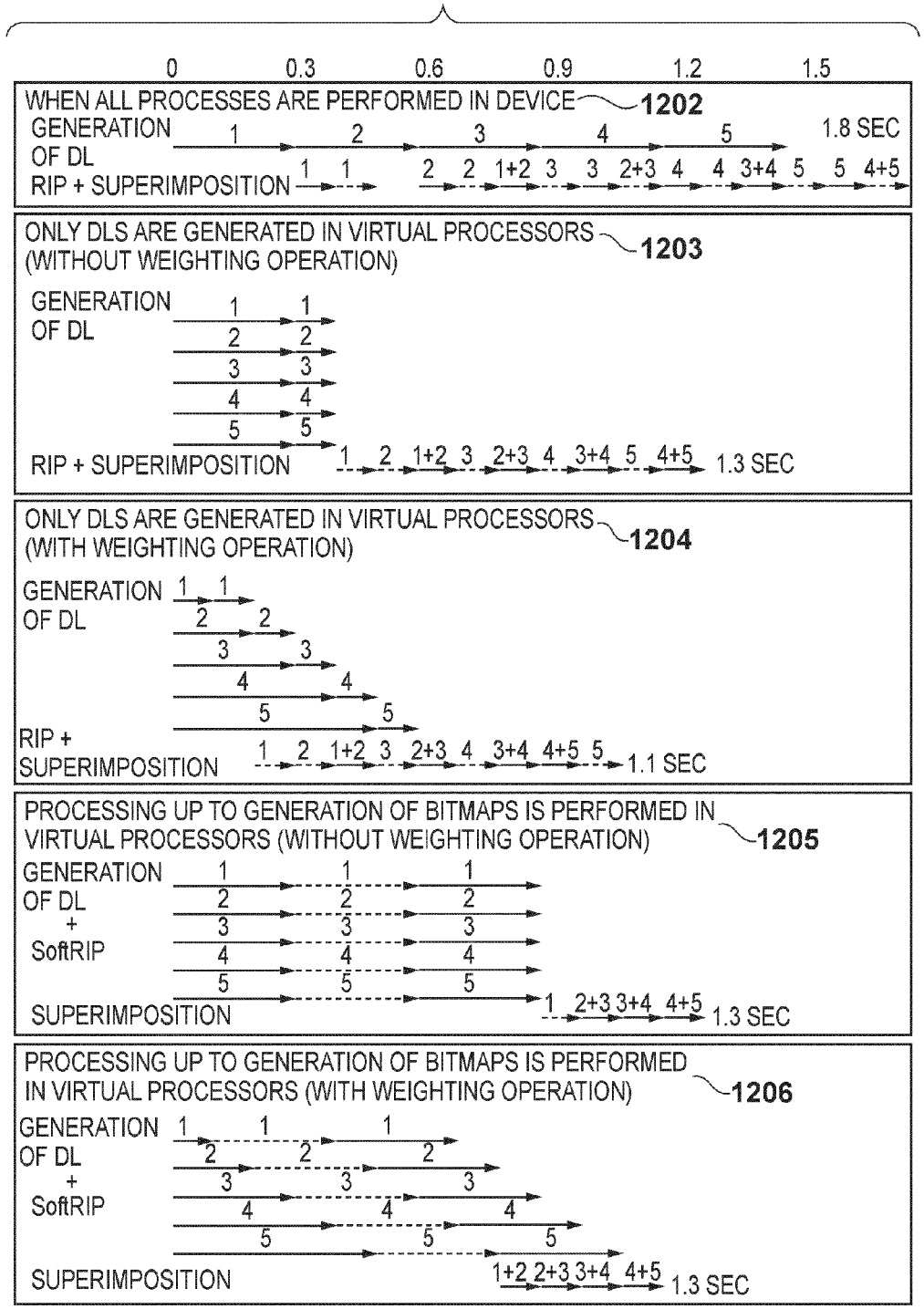

Processing speed estimation in layer segmentation in this embodiment will be described next with reference to FIGS. 12A and 12B. FIG. 12A shows various kinds of conditions 1201 assumed in this estimation. First of all, data processed is PDL data having complicated render commands which do not allow to achieve an engine speed of 50 ppm, if the current PDL data is not segmented. In this case, assume the following. When the levels are uniformly distributed, the time taken to generate the DL of one layer is 0.3 sec. The time taken for the RIP (Hard) on the device to render is 0.1 sec. The time taken for the RIP (Soft) on virtual processors is 0.3 sec. The time taken to perform superimposition at the time of rendering is 0.1 sec. The time taken to transfer the DL to the device is 0.1 sec. The time taken to transmit a bitmap to the device is 0.3 sec. Assume also that the number of DLs that can achieve the engine speed is estimated to be five.

Under these premises, as shown in FIG. 12B, a timing chart 1202 indicates a case in which all the processes are performed within the device without using the existing cloud. In this case, since one CPU generates DLs, it is possible to process the DLs concurrently with RIP. This processing takes a total of 1.8 sec. Obviously, 50 ppm cannot be achieved.

A timing chart 1203 indicates a case in which virtual processors perform processing up to the generation of DLs without weighting operation described in association with <Weighting in Page Segmentation>. In this case, DLs are concurrently generated. However, it is not possible to start RIP until the processing associated with the background layer is complete. Therefore, the generation of DLs and RIP are not concurrently performed. As a consequence, this processing takes a total of 1.3 sec.

A timing chart 1204 indicates a case in which virtual processors performs processing up to the generation of DLs while performing weighting operation described in association with <Weighting in Page Segmentation>. In this case, since DLs are concurrently generated with weighting operation, the generation of the DL of the background layer is complete earlier than other layers, the DLs are generated concurrently with RIP. This processing takes a total of 1.1 sec. Obviously, an engine speed of 50 ppm can be achieved.

A timing chart 1205 indicates a case in which virtual processors perform processing up to the generation of bitmaps without performing weighting operation described in association with <Weighting in Page Segmentation>. In this case, although parallel processing is performed among the respective layers, the generation of DLs is not parallel with the generation of bitmaps. In addition, rendering to bitmaps increases the amount of information as compared with DLs, and hence it takes much time to transfer the information to the device. Obviously, this processing takes a total of 1.3 sec.

A timing chart 1206 indicates a case in which virtual processors perform processing up to the generation of bitmaps while performing weighting operation described in association with <Weighting in Page Segmentation>. In this case, although parallel processing is performed among the respective layers, the generation of DLs is not parallel with the generation of bitmaps. In addition, rendering to bitmaps increases the amount of information as compared with DLs, and hence it takes much time to transfer the information to the device. Obviously, this processing takes a total of 1.2 sec.

As described above, it is expected to speed up the processing by making virtual processors generate segmented DLs and to speed up the processing by implementing parallel processing in PDL segmentation by performing weighting operation.

When Virtual Processor Group Generate No DL Even after Lapse of Predetermined Period of Time>

Figure 13A:
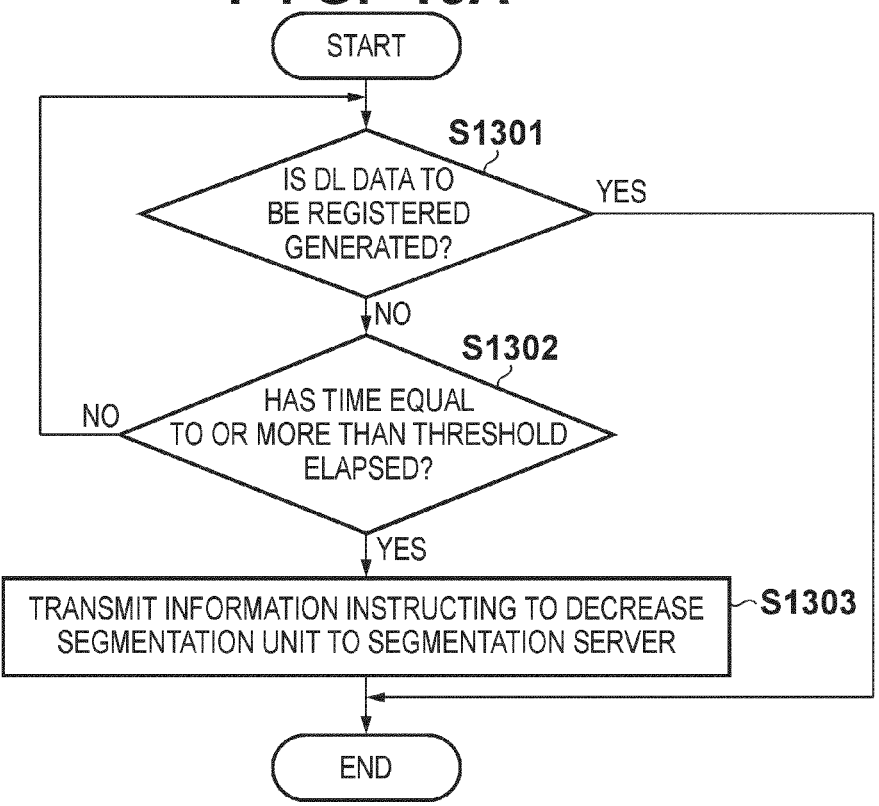
FIG. 13A is a view showing a case in which the virtual processors generate no DL even after the lapse of a predetermined period of time.

Processing to be performed when the virtual processor group generates no DL even after the lapse of a predetermined period of time will be described next with reference to FIG. 13A. In step S1301, the virtual processor group 102 determines whether the PDL segmentation server 103 has generated DL data. This determination is the same as that in step S909 or S914. If YES in step S1301, the virtual processor group 102 terminates this processing. If NO in step S1301, the virtual processor group 102 determines in step S1302 whether the determination in step S1301 has been performed for a time equal to or more than a time corresponding to a given threshold. If NO in step S1302, the process returns to step S1301 to perform determination again. If YES in step S1302, the virtual processor group 102 transmits information instructing to reduce the segmentation unit to the PDL segmentation server 103 in step S1303, and then terminates this processing.

<Decision of Number of Virtual Processors in Accordance with Charge System>

Figure 13B:
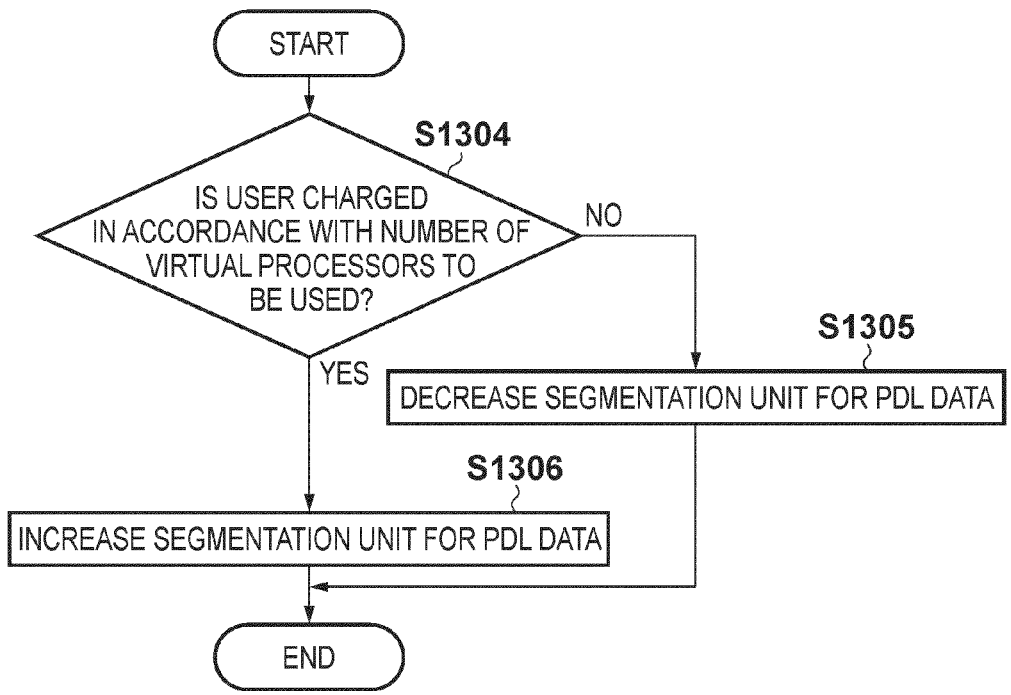
FIG. 13B is a flowchart showing the processing of deciding the number of virtual processors in accordance with a charge system.

The decision of the number of virtual processors in accordance with a charge system will be described next with reference to FIG. 13B. In step S1304, the PDL segmentation server 103 determines whether the user is charged in accordance with the number of virtual processors to be used. If YES in step S1304, the PDL segmentation server 103 increases the segmentation unit for PDL data in step S1306, and terminates this processing. If NO in step S1304, the PDL segmentation server 103 decreases the segmentation unit to achieve the engine speed, and terminates this processing.

Note that in this embodiment, the PDL data generated by the client PC 105 is transmitted to the cloud. However, this system may be configured to generate PDL data on the cloud.

According to the present invention, it is possible to minimize the uneven distribution of the numbers of render instructions upon segmentation to perform optimal parallel processing. In addition, the embodiment is configured to segment data in consideration of the performance of the output device. This makes it possible for the output device to fully exert its performance even for data which includes many render instructions and does not allow the conventional output device to exert its performance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-189986, filed Aug. 26, 2010, which is hereby incorporated by reference herein in its entirety.

What is claimed is:

1. An apparatus comprising:
a segmenting unit configured to segment render objects included in a page into a first and second group based on a layer of each of the render objects, layers of render objects in the first group being closer to a background of the page than every layer of render objects in the second group; and
a providing unit configured to provide the render objects in the first group to a first processor earlier than the render objects in the second group to a second processor.

2. The apparatus according to claim 1, wherein a processor is a virtual processor.

3. The apparatus according to claim 1, wherein the number of render objects in the first group is smaller than the number of render objects in the second group.

4. The apparatus according to claim 1, wherein each of the first and second processors generates a bitmap from the provided render objects.

5. The apparatus according to claim 4, further comprising:
a superimposing unit configured to superimpose bitmaps provided by the respective processors sequentially from a bitmap closest to a background of a page.

6. The apparatus according to claim 1, wherein generation by one of the processors is performed in parallel with generation by another one of the processors.

7. The apparatus according to claim 1, wherein each of the render objects is a display list.

8. A method comprising:
a segmenting step of segmenting render objects included in a page into a first and second group based on a layer of each of the render objects, layers of render objects in the first group being closer to a background of the page than every layer of render objects in the second group; and
a providing step of providing the render objects in the first group to a first processor earlier than the render objects in the second group to a second processor.

9. The method according to claim 8, wherein a processor is a virtual processor.

10. The method according to claim 8, wherein the number of render objects in the first group is smaller than the number of render objects in the second group.

11. The method according to claim 8, wherein each of the first and second processors generates a bitmap from the provided render objects.

12. The method according to claim 11, further comprising:
a superimposing step of superimposing bitmaps provided by the respective processors sequentially from a bitmap closest to a background of a page.

13. The method according to claim 8, wherein generation by one of the processors is performed in parallel with generation by another one of the processors.

14. The method according to claim 8, wherein each of the render objects is a display list.

15. A non-transitory computer-readable storage medium on which is stored a computer-executable program which when implemented causes a computer to perform:
a segmenting step of segmenting render objects included in a page into a first and second group based on a layer of each of the render objects, layers of render objects in the first group being closer to a background of the page than every layer of render objects in the second group; and
a providing step of providing the render objects in the first group to a first processor earlier than the render objects in the second group to a second processor.

16. The non-transitory computer-readable storage medium according to claim 15, wherein a processor is a virtual processor.

* * * * *